Jan. 14, 1969 R. P. SOURGENS 3,422,221
TELEGRAPHIC CODE CONVERTER
Filed May 24, 1965
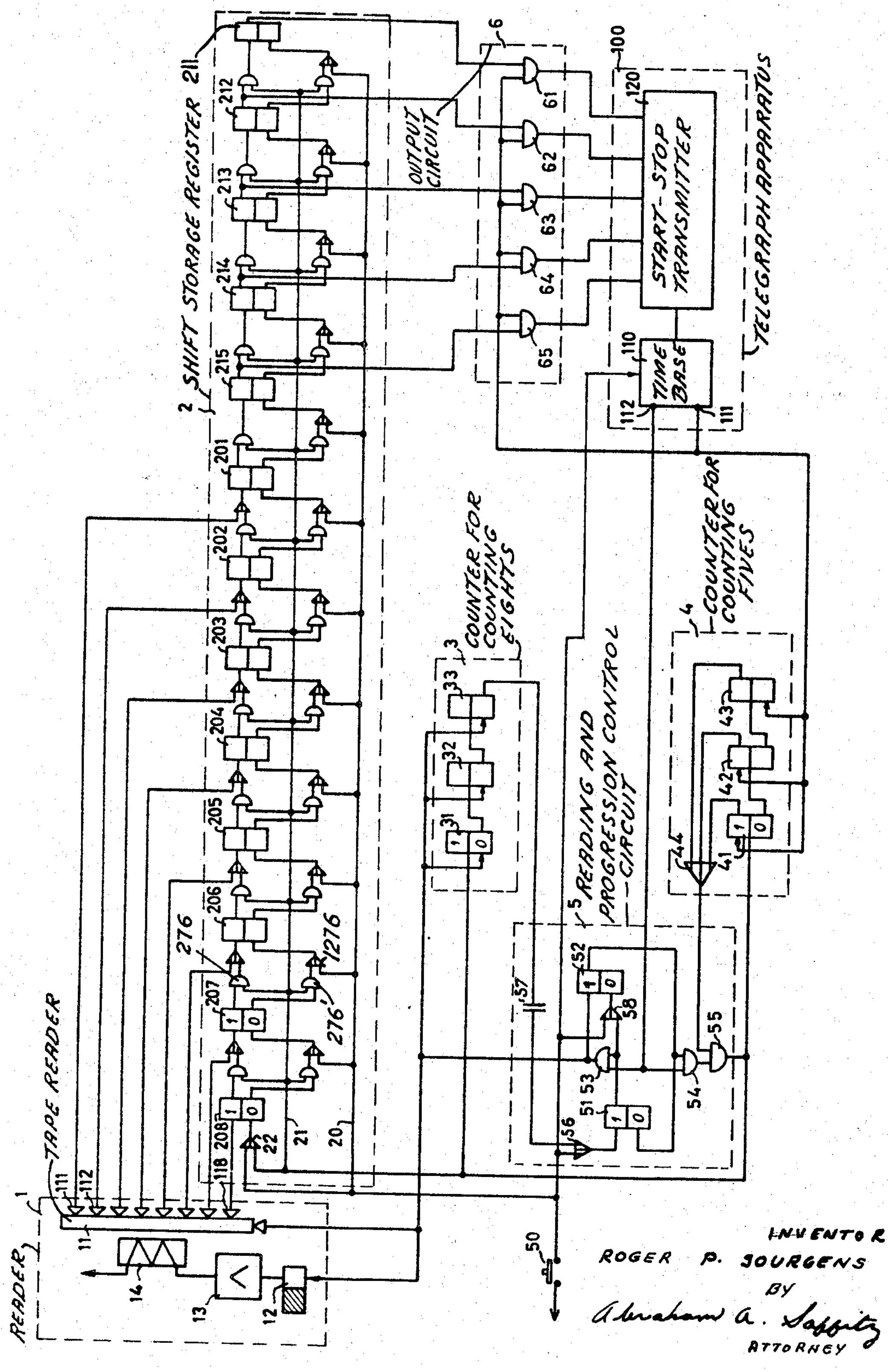
INVENTOR
ROGER P. SOURGENS
BY
Abraham A. Saffitz
ATTORNEY United States Patent Office 3,422,221

Patented Jan. 14, 1969

3,422,221

TELEGRAPHIC CODE CONVERTER

Roger P. Sourgens, Bourg-la-Reine, France, assignor to Societe d'Applications Generales d'Electricite et de Mecanique, Paris, France, a company of France Filed May 24, 1965, Ser. No. 457,932
Claims priority, application France, May 29, 1964, 976,444
U.S. Cl. 178—26 5 Claims
Int. Cl. H04l 15/34

ABSTRACT OF THE DISCLOSURE

Telegraphic code converter for transmission by start-stop telegraphic system having $p$ information elements recorded in a digital code having $n$ elements, the code converter comprising a shift storage register having $n+p$ flip-flop circuits controlled by the telegraphic system, a first counter counting $n$ steps of the storage of the register, a second counter counting $p$ steps of the storage of the register, a tape reader having $n$ elements, circuit means controlled by the first counter and transferring in parallel the $n$ binary elements of each character of the $n$-code to the first $n$ flip-flop circuits of the storage of the register every time the register has progressed $n$ steps, and an output circuit controlled by the second counter and transferring in parallel the contents of the last $p$ flip-flop circuits of the storage register to the telegraphic system whenever the register has progressed $p$ steps. At the receiving end of the system, inverse code conversion is effected in similar fashion, incoming information having $p$ elements being transposed into the $n$ element code.

The present invention relates to a transmitting device for code conversion, e.g. a transcoding, device capable of converting information recorded in accordance with a digital code having $n$ elements for start-stop transmission to a system having $p$ elements whereby two-way transcoding can be accomplished in the system. In a preferred form, the transcoding device provides bilateral conversion between a digital code comprising any number of elements in a five element combination which can be transmitted on a telex system, and inversely.

It is known that International Telegraph Alphabet 2 (see "Reference Data for Radio Engineers" fourth edition, International Telephone and Telegraph Corporation, New York, page 844) used on the telegraph system in general usage known as the telex system comprises thirty-two characters, each of which is one of the combinations of five binary code elements and that the generalization of the use of digital information has led to the creation of binary codes comprising a larger number of characters and consequently of constituent code elements for each of these characters. Thus there are a certain number of data codes having six, seven, or eight elements, all attempts to unify which have been unavailing.

The general object of the present invention is to provide a bilateral conversion device between a digital code having $n$ elements and a start-stop telegraphic transmission system having $p$ elements.

One particular object of the present invention is to permit the transmission by the telex system of digital information expressed in a binary code having more than five elements.

According to the invention, transmission by a start-stop telegraphic system having $p$ information elements recorded in accordance with a digital code having $n$ elements is effected through the medium of a transcoder comprising essentially a shift memory having $n+p$ flip-flop circuits progressing under the control of said telegraphic system, a first counter counting $n$ steps of the storage of the register a second counter counting $p$ steps of the storage of the register, a tape reader having $n$ elements, controlled by said first counter and transferring in parallel the $n$ binary elements of each character of the $n$-code to the first $n$ flip-flop circuits of the storage of the register every time the latter has progressed $n$ steps, and an output circuit controlled by said second counter and transferring in parallel the contents of the last $p$ flip-flop circuits of the storage register to the telegraphic system whenever the latter has progressed $p$ steps; at the receiving end the inverse transcoding is effected in the same way, the incoming information having then $p$ elements and being transposed into the $n$-element code.

The invention will be better understood on reading the following description and examining the accompanying drawing, of which the single figure illustrates diagrammatically one example of construction of a transcoder, from eight to five elements, according to the invention. In order to make the drawing as clear as possible, no hypothesis has been made regarding the nature or the type of the constituent elements of the flip-flops or regarding the polarity of the signals. The convention adopted is that a flip-flop is brought into one state (zero) by a signal applied to the left-hand side of its upper (lower) half, the output of which. situated on the right-hand side of the same half, then becomes active.

The transcoder thus illustrated corresponds to the case $n=8$ and $p=5$ comprises essentially:

A reading unit 1 for reading eight-element perforated tapes;

A shift storage register 2 comprising eight input flip-flops 201–208 and five output flip-flops 211–215;

A counter 3 for counting eights;

A counter 4 for counting fives;

A reading and progression control circuit 5;

An output circuit 6 having five outputs connected to the five inputs of a telegraphic apparatus 100 comprising a start-stop transmitter 120 the operation of which is controlled by a time base 110.

The perforated tape reading unit comprises a tape reader 11 having eight pick-off elements 111–118 respectively connected by OR gates to the inputs for bringing the flip-flops 201 to 208 into state one, and a perforated tape progression device composed of a monostable progression control flip-flop 12 having a time constant of the order of 40 milliseconds, an amplifier 13, and a perforated tape progression electric-magnet 14.

In the shift storage 2, the outputs one and zero of each flip-flop are connected respectively to the inputs one and zero of the flip-flop following in the direction of progression, that is to say in the direction 208–201, 215–211, by two AND gates, for example 276 and 276', the second inputs of which are connected in parallel to a progression bar 21 which is also connected, through the medium of an OR gate 22, to the zeroizing input of the flip-flop 208. The flip-flops 208 and 201 may in addition be brought into one state by the pick-off elements 118 to 111 respectively. All the flip-flops of the shift storage register 2 may be simultaneously returned to zero through the medium of OR gates, for example 1276, by means of a push-button contact 50 known as the "on button," the closing of which connects a bus bar 20 to a source of voltage, not illustrated.

Each of the counters 3 and 4 has three flip-flops 31–33 and 41–43. Each of the flip-flops 31–33 has a rezeroizing input and the output of the counter 3 is the zero output of the flip-flop 33, so that said counter supplies a pulse every time eight successive pulses have been applied to the symmetrical input of the flip-flop 31. The flip-flops 41 and 42 have an input for resetting to one state, the flip-flop 43 has a rezeroizing input. These three resetting and rezeroizing inputs are connected in parallel to a terminal 111 of the time base 110, at which a pulse appears at the moment zero of each start-stop cycle of the telegraphic transmission.

The one outputs of the three flip-flops 41–43 are connected to the three inputs of an OR gate 44 at the output of which a signal consequently appears at the moment zero of each cycle of transmission, disappearing at the fifth subsequent progression of the counter 4, the three flip-flops of which are then once again at zero.

The reading and progression control circuit 5 comprises two flip-flops 51 and 52 known respectively as the reading flip-flop and the progression flip-flop. The input of the flip-flop 51 for bringing the latter into the one position is connected by an OR gate 56 on the one hand to the contact 50 and on the other hand through the medium of a capacitor 57 to the output of the counter 3. The one output of the flip-flop 51 is connected to an input of an AND gate 53 and through the medium of an OR gate 58, the second input of which is connected to the contact 50, to the zeroizing input of the flip-flop 52. The input of the flip-flop 52 for bringing the latter into the one position is connected to the output of the gate 53 and the one output of this flip-flop is connected in parallel to an input of an AND gate 54 and to the zeroizing input of the flip-flop 51. The second inputs of the gates 53 and 54 are connected in parallel to a terminal 112 of the time base 110 on which pulses appear at the moments 20, 40, 60, 80, 100 and 120 milliseconds of each transmission cycle. The gate 53 is in addition connected to the rezeroizing input of the counter 3, to the feed input of the perforated tape reader 11, and to the input of the monostable flip-flop 12. The output of the gate 54 is connected to an input of an AND gate 55, the second input of which is connected to the output of the OR gate 44. The output of the gate 55 is connected to the progression bar 21 of the shift memory 2, to the progression input of the counter 3, and to the progression input of the counter 4.

The output circuit 6 comprises five AND gates 61–65 having their first inputs connected respectively to the one outputs of the flip-flops 211–215 and their second inputs connected in parallel to the terminal 111 of the time base 110.

In order to transmit in groups of five elements by means of the five-element start-stop telegraphic transmitter 100, the elements of information recorded in accordance with an eight-element code on a perforated tape disposed in the reader 11, the transcoder described above is operated by the momentary closure of the contact 50, which has the effect of returning to zero all the flip-flops of the shift storage register 2 and of bringing the flip-flops 51 and 52 respectively into the one and zero states, which has the result that the gate 53 is opened and the gate 54 closed. In addition, the closure of the contact 50 unlocks the time base 110.

At the moment zero of the transmission cycle, the pulse appearing at the terminal 111 of the time base 110 resets the counter 4 to the binary number 011 and unlocks the five gates 61 to 65, which has the effect that the blank (all spaces) combination is supplied to the transmitter 120.

At the moment 20 milliseconds, the pulse coming from the terminal 112 and passing through the gate 53, which is open, provokes the reading-out of the register 11 and the parallel transfer of the word read-out to the flip-flops 201–208 operates the monostable progression control flip-flop for the perforated tape, returns the counter 3 to zero, and brings the flip-flop 52 into the one position which has the effect of unlocking the gate 54, returning the flip-flop 51 to zero, and locking the gate 53.

At the moments 40, 60, 80, 100, 120 milliseconds, the pulses coming from the terminal 112 pass through the gate 54 and, since the counter 4 is not at zero they also pass through the gate 55, giving rise to a progression of five successive steps of the shift storage register 2, the counter 3, and the counter 4, which thus comes to zero and blocks the gate 54.

At the moment zero of the following transmission cycle, the first five binary elements of the eight-element character introduced into the storage register 2 at the moment 20 milliseconds in the preceding transmission cycle are transferred to the transmitter 120 and the counter 4 is reset to the binary number 011, which unlocks the gate 55, which has the effect that the pulses appearing at the terminal 112 at the moments 20, 40, and 60 milliseconds thereafter cause a progression of the storage register 2 and the counters 3 and 4, but at the moment 60 milliseconds the bringing of the counter 3 to zero has the effect of bringing the flip-flop 51 to the one position and the flip-flop 52 to the zero position, opening the gate 53 and locking the gate 54. In consequence, the following pulse at the moment 80 milliseconds gives rise to the introduction of the second eight-element character of the information to be converted in the shift storage register, and the return to the progression condition. Two steps are thus made at the moments 100 and 120, which brings up to five the number counted by the counter 4 since its resetting and consequently its return to zero, which blocks the gate 55 until the following zero moment when it is reset to the binary number 011, while the contents of the flip-flops 211 to 215, that is to say the last three elements of the first eight-element character introduced into the storage register 2 and the first two elements of the following eight-element character, are transferred in parallel to the transmitter 120. The code conversion is continued in the same manner until transfer has been made of all the elements of the last eight-element character recorded on the perforated tape introduced into the reader 11, the output transfer between the flip-flops 211 to 215 and the transmitter 120 being effected each time the counter 4 has counted five progression pulses and the introduction of the eight elements of a new eight-element character into the flip-flops 201 to 208, or the marking, being effected each time the counter 3 has counted eight progression pulses.

At the receiver the inverse code conversion from five digit code words to eight digit code words is effected similarly, the five digits of the word read-out being transferred into the first five flip-flops of the shift storage register each time five progression pulses have been counted and the output transfer being effected between the last eight flip-flops of the shift storage register and an eight-element recording apparatus, such as a punch through an eight gate output circuit, every time eight progression pulses have been counted.

It is not necessary for the total number of binary digits of the information coded in the eight-element code to be a multiple of five, because, if it is not an integer multiple, case the last five-element character transmitted is completed automatically by space elements which disappear at the receiver, in the course of the inverse transcoding operation.

The invention has been described in detail above with the aid of an embodiment adapted to the code conversion of an eight-digit data code for the purpose of its transmission on the telex system. It must be understood that this example is in no way limitative and that the invention also applies to the code conversion of seven- or six-digit data codes for the purpose of transmission on the five-element telegraphic system, and more generally to any code conversion device making it possible, by means of the same fundamental characteristics, to effect a bilateral conversion between a digital code of $n$ elements and a start-stop telegraphic transmission system of $p$ elements.

I claim:

1. A telegraphic code converter for transmission by start-stop telegraphic system having $p$ information elements recorded in a digital code having $n$ elements, the code converter comprising a shift register having $n+p$ flip-flop circuits controlled by the telegraphic system, a first counter counting $n$ steps of the storage of the register and a second counter counting $p$ steps of the storage of the register, a reader having $n$ elements, circuit means controlled by said first counter and transferring in parallel the $n$ binary elements of each character of the $n$-code to the first $n$ flip-flop circuits of the register every time said register has progressed $n$ steps, and an output circuit controlled by said second counter and transferring in parallel the contents of the last $p$ flip-flop circuits of said register to said telegraphic system whenever said register has progressed $p$ steps.

2. A telegraphic code converter as claimed in claim 1 having a receiver for inverse code conversion wherein incoming information having $p$-elements is transposed into the $n$-element code.

3. A telegraphic code converter as claimed in claim 2 wherein said start-stop telegraphic system includes a transmission code converter and reception code converter for the transmission and reception of data coded in a digital code of 8 elements using the International Telegraph Alphabet 2, said converters each comprising a shift storage register having $8+5=13$ flip-flops progressing under the control of said telegraphic system, a first and a second part of said flip-flops being respectively provided with parallel input and output means, a first and a second counter counting respectively eight and five steps of said register, said counters controlling respectively in said transmission transcode the inputs and the outputs of said register and in said reception code converter the outputs and the inputs of said register.

4. A telegraphic code converter as claimed in claim 1 wherein said reader is a tape reader.

5. A telegraphic code converter as claimed in claim 1 wherein said circuit means is a reading and progression control circuit connected to said start-stop transmitter and to said reader.

References Cited

UNITED STATES PATENTS

| | | | |
|---|---|---|---|
| 2,520,142 | 8/1950 | Herbst | 178—26.5 |
| 2,744,955 | 5/1956 | Canfora | 178—26.5 |
| 2,997,541 | 8/1961 | Grotrup | 178—26.5 |
| 3,055,978 | 9/1962 | Shairin | 178—26.5 |

THOMAS B. HABECKER, *Primary Examiner.*

U.S. Cl. X.R.

328—42